US009970594B2

(12) United States Patent
Doki

(10) Patent No.: US 9,970,594 B2
(45) Date of Patent: May 15, 2018

(54) AUTOMATIC DRAIN

(71) Applicant: Koganei Corporation, Koganei-shi, Tokyo (JP)

(72) Inventor: Makoto Doki, Koganei (JP)

(73) Assignee: Koganei Corporation, Koganei-shi, Tokyo (JP)

( * ) Notice: Subject to any disclaimer, the term of this patent is extended or adjusted under 35 U.S.C. 154(b) by 0 days. days.

(21) Appl. No.: 15/301,077

(22) PCT Filed: Nov. 14, 2014

(86) PCT No.: PCT/JP2014/080155

§ 371 (c)(1),
(2) Date: Sep. 30, 2016

(87) PCT Pub. No.: WO2015/159449

PCT Pub. Date: Oct. 22, 2015

(65) Prior Publication Data

US 2017/0016573 A1    Jan. 19, 2017

(30) Foreign Application Priority Data

Apr. 15, 2014  (JP) .................................. 2014-083795

(51) Int. Cl.
F16T 1/20    (2006.01)
F16T 1/22    (2006.01)

(52) U.S. Cl.
CPC . F16T 1/20 (2013.01); F16T 1/22 (2013.01)

(58) Field of Classification Search
CPC ....... F16T 1/20; F16T 1/22; F16T 1/24; F16T 1/26; F16T 1/28; F16T 1/30; F16T 1/305; F16T 1/32

(Continued)

(56) References Cited

U.S. PATENT DOCUMENTS 3,418,789 A    12/1968 Hoffman et al.
3,993,090 A *  11/1976 Hankison .................. F16T 1/20
                                              137/195

(Continued)

FOREIGN PATENT DOCUMENTS

JP    S45-36182 B    11/1970
JP    S51-43935 U    9/1974

(Continued)

OTHER PUBLICATIONS

International Search Report for PCT Serial No. PCT/JP2014/080155, dated Feb. 3, 2015.

*Primary Examiner* — Ian Paquette
(74) *Attorney, Agent, or Firm* — McCormick, Paulding & Huber LLP

(57) ABSTRACT

A drain hole for connecting a discharge hole and the inside of a collection container to each other is formed in a valve seat member. A float support is provided with a cylinder portion in which a piston is incorporated in a slidable manner. An vent valve for opening and closing a vent hole by means of a float is provided to the float support. A drain valve which operates between a closing position at which the drain valve closes the drain hole and an open position at which the drain valve opens the drain hole is provided to the piston. A bleed channel for connecting a piston chamber and the discharge hole to each other is formed by an orifice pin mounted in a bleed hole provided to the drain valve.

7 Claims, 12 Drawing Sheets

(58) Field of Classification Search
USPC .................................. 137/171, 177, 183, 192
See application file for complete search history.

(56) References Cited

U.S. PATENT DOCUMENTS

| | | | | |
|---|---|---|---|---|
| 5,121,767 | A * | 6/1992 | Chuang | .................. F04B 39/16 |
| | | | | 137/195 |
| 5,595,210 | A * | 1/1997 | Kushiya | .................. F16K 31/34 |
| | | | | 137/181 |
| 2007/0006918 | A1 * | 1/2007 | Yamamoto | ................ F16T 1/20 |
| | | | | 137/195 |

FOREIGN PATENT DOCUMENTS

| | | |
|---|---|---|
| JP | H02-038598 U1 | 3/1990 |
| JP | H03-111915 A | 5/1991 |
| JP | 2005-155727 A | 6/2005 |

\* cited by examiner

AUTOMATIC DRAIN

CROSS REFERENCE TO RELATED APPLICATION

This application is entitled to the benefit of and incorporates by reference subject matter disclosed in International Patent Application No. PCT/JP2014/080155 filed on Nov. 14, 2014 and Japanese Patent Application No. 2014-083795 filed on Apr. 15, 2014, the contents of all of which are incorporated by reference herein.

TECHNICAL FIELD

The present invention relates to an automatic drain ("autodrain") which separates and collects foreign matters such as liquid from compressed air, and which automatically discharges collected and accumulated foreign matters to the outside when the amount of accumulated foreign matters reaches a predetermined amount.

BACKGROUND ART

An automatic drain for draining a liquid component, such as water and oil, contained in the compressed air is provided to an air pressure line through which compressed air is supplied from an air pressure source to air-supplied components such as pneumatic equipment.

A float-type automatic drain, as described in Japanese Patent Application Laid-Open Publication No. 2005-155727, includes a collection container in which liquid is collected, together with a tiny solid material contained in compressed air. A valve seat having a discharge hole and a drain valve that opens and closes the discharge hole are attached to a bottom of the collection container. When the amount of liquid collected in the collection container reaches a predetermined amount, the discharge hole is automatically opened by the drain valve.

The drain valve is provided to a piston which is attached in a cylinder and movable in an axial direction. A float is disposed on the outside of the cylinder. When the amount of accumulation of the collected liquid reaches the predetermined amount, a vent valve is opened by the float, which causes air to be supplied into a piston chamber in the cylinder. Being subjected to the force of this incoming air, the piston in the piston chamber drives the drain valve. As a result, the discharge hole is opened, which causes the liquid collected in the collection container to drain out of the discharge hole.

To discharge air in the piston chamber to the outside, an orifice, i.e., bleed hole is provided to the drain valve. A length of time required for discharging the liquid to the outside corresponds to the length of time required for discharging air in the piston chamber to the outside via the orifice. An increase in inner diameter of the orifice reduces the length of time required for discharging air in the piston chamber to the outside. In such a case, therefore, the drain valve is closed before the entire liquid collected in the collection container is discharged to the outside.

Japanese Utility Model Application Laid-Open Publication No. 51-43935, microfilms discloses a drain ejector including a valve stem having a valve attached to a lower end of the valve stem, the valve working as a drain valve. A fixed orifice communicating with a back pressure chamber is disposed on an upper end of the valve stem, and the valve's open interval of time is extended by a spring link.

Japanese Examined Patent Application Publication No. 45-36182 discloses a servo and an automatic liquid discharge mechanism. A piston serving as a partition member and a coil spring for applying a spring force to the piston are incorporated in the servo. The servo and a float disposed on top of the servo are housed in the container of the automatic liquid discharge mechanism. The partition member is provided with an arbor serving as a drain valve, and the arbor has a bleeding hole in which a starting bar is placed to be axially movable. An upper end of the starting bar extends to the inside of the float. The starting bar thus moves up and down depending on the upward and downward movement of the float. The upward and downward movement of the starting bar prevents entry of foreign matters into the bleeding hole.

SUMMARY OF THE INVENTION

According to Japanese Examined Patent Application Publication No. 45-36182, the float is disposed on top of the servo, and the piston functioning as the partition member and the spring are incorporated in the servo. In this arrangement, the length dimension of the container in which the servo and float are incorporated is large. Miniaturizing an automatic drain including such a long container is, therefore, difficult. Besides, to miniaturize the automatic drain, the capacity of the piston chamber supplied with compressed air from the collection container must be reduced. The length of time required for discharging compressed air of the piston chamber to the outside corresponds to the length of time required for discharging liquid collected in the collection chamber to the outside. It is necessary to set a period of time from start to finish the discharge of almost all the liquid in the collection container. That is, the length of time required for discharging the liquid to the outside increases with increase in capacity of the piston chamber. If the inner diameter of the orifice communicatively connecting the piston chamber to the outside is reduced to lessen the flow rate of compressed air in the orifice, it results in an increase in the length of time required for discharging the liquid. For this reason, when designing the reduced capacity of the piston chamber, the inner diameter of the orifice communicatively connecting the piston chamber to the outside is usually designed to be small.

For a small-sized automatic drain, the inner diameter of its orifice must be determined to be 0.1 mm or smaller. Forming such a hole, i.e., orifice, with a small diameter on a resin drain valve formed by injection molding is difficult. Forming such an orifice by a boring process using a drill is also difficult. Such an orifice has a small inner diameter and a long, deep hole, and therefore can hardly be made by resin molding using a die or by drilling. In this case, therefore, manufacturing the drain valve is difficult, which puts limitations on an improvement in the manufacturing yield of the drain valve.

Besides, if foreign matters are caught in an orifice with a small diameter, because of the foreign matters, the actual inner diameter of the orifice turns out to be smaller than the original diameter of the orifice. This results in a delay in a returning action to an original state after discharging the collected liquid, thus leading to the deterioration of the operation characteristics of the automatic drain.

An object of the present invention is to provide an automatic drain improved in operation characteristics and reduced in size.

Another object of the present invention is to further improve the automatic drain in assembling workability.

According to one aspect of the present invention, there is provided an automatic drain comprising: a port block, an inflow port and an outflow port being provided to an upper part of the port block; and a collection container, a discharge hole being provided to a bottom part of the collection container, liquid separated from compressed air flowing from the inflow port to the outflow port is automatically discharged to outside, the automatic drain further comprising: a valve seat having a drain hole through which an inside of the collection container communicates with the discharge hole, the valve seat being attached to the bottom part of the collection container; a float support disposed on top of the valve seat, the float support having a cylindrical portion in which a piston is incorporated and slidably movable in an axial direction and a top wall portion provided to an upper end of the cylindrical portion and forming a piston chamber between the top wall portion and the piston; a float disposed on the outside of the float support, the float being moved up and down by liquid collected in the collection container; a vent valve in which, when the float moves up, the vent valve opens a vent hole provided to the top wall portion to supply air in the collection container to the piston chamber, and when the float moves down, the vent valve closes the vent hole; a drain valve provided to the piston, the drain valve being shifted to a closing position at which the drain valve closes the drain hole and to an open position at which the drain valve opens the drain hole; an opening spring attached to the piston chamber, the opening spring applying a spring force to the drain valve in a direction causing the drain valve to move toward the open position; a bleed hole provided to the drain valve, the piston chamber communicating with the discharge hole via the bleed hole; and an orifice pin placed in the bleed hole, the orifice pin forming a bleed channel between the orifice pin and an inner surface of the bleed hole.

The liquid accumulated in the collection container of the automatic drain is discharged through the drain hole provided to the valve seat to the outside. The drain valve which opens and closes the drain hole is integrally provided with the piston. When the level of the accumulated liquid rises, it moves the float up, which causes compressed air in the collection container to be supplied into the piston chamber, in which the piston moves down, thus opening the drain valve. When the compressed air supplied into the piston chamber is discharged out of the bleed channel provided to the drain valve, the piston moves up, closing the drain hole. The length of time required for discharging the liquid through the opened drain hole to the outside corresponds to the length of time required for discharging the compressed air of the bleed channel. By composing the bleed channel from the bleed hole and the orifice pin inserted therein, the bleed channel is formed precisely as a bleed channel with an extremely small channel area. Even if the capacity of the piston chamber is small, therefore, the time required for the compressed air in the piston chamber to flow through the bleed hole to the outside is increased, which means that a liquid discharge time of a sufficient length is achieved. As a result, the size of the automatic drain can be reduced, and at the same time, its operation characteristics can be improved. In such a case, fewer errors are made in machining the drain valve, so that fewer defective automatic drains result. Hence the assembling workability of the automatic drain is improved.

DESCRIPTION OF THE PREFERRED EMBODIMENTS

Figure 1:
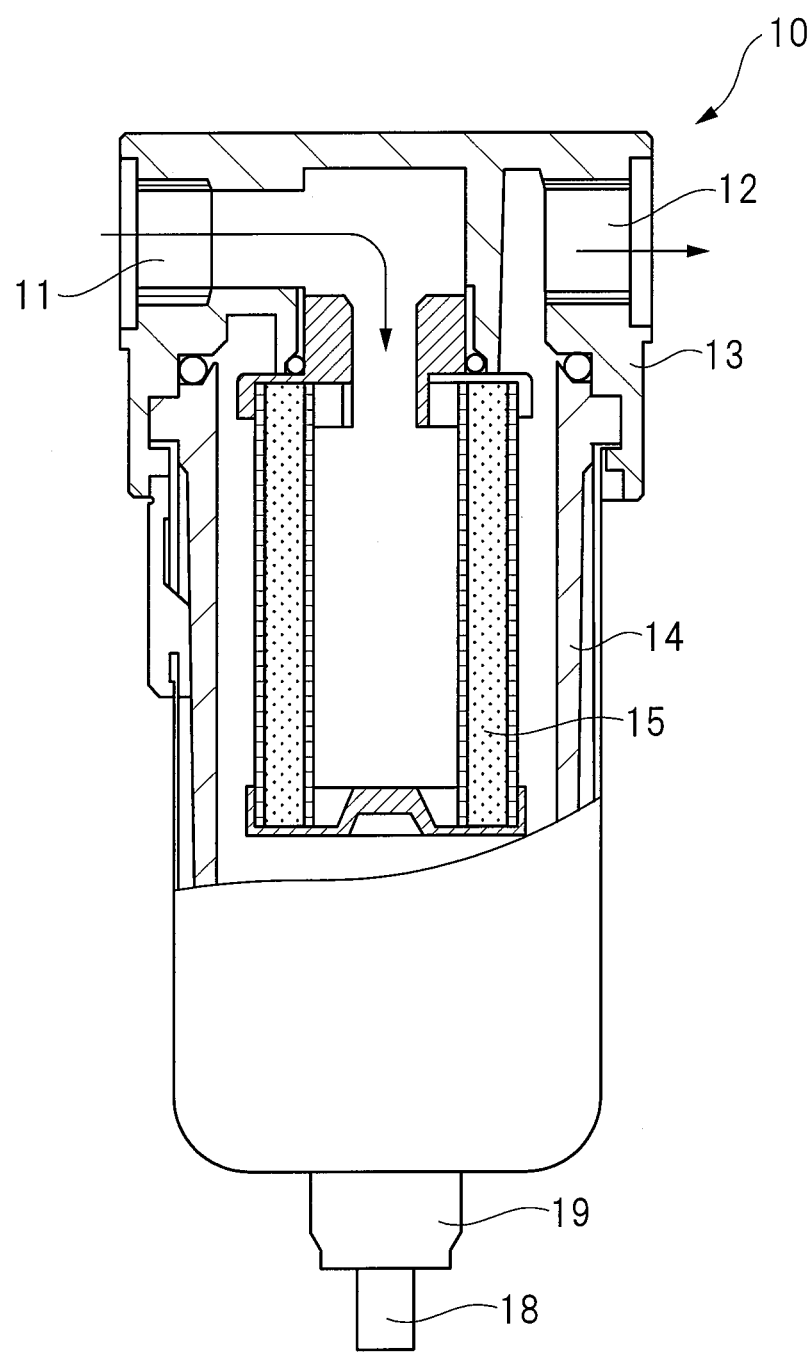
FIG. 1 is a partially cut out front view showing an automatic drain according to one embodiment.

Hereinafter, embodiments of the present invention will be described in detail with reference to the drawings. As shown in FIG. 1, an automatic drain 10 includes a port block 13 having an inflow port 11 and an outflow port 12 for taking in and discharging compressed air. A collection container 14 is referred also as "bowl" and attached to the port block 13. The port block 13 forms part of the collection container 14, and the inflow port 11 and the outflow port 12 are provided to the upper part of the port block 13. A space disposed below the port block 13, that is, formed in the collection container 14 serves as a separation space. A cylindrical filter element assembly 15 is disposed in the collection container 14, and attached to the port block 13. This automatic drain 10 is incorporated in an air pressure line for supplying compressed air from an air pressure source to pneumatic equipment, a primary pipeline extending from the air pressure source is connected to the inflow port 11, and a secondary pipeline leading to the pneumatic equipment is connected to the outflow port 12.

The automatic drain 10 is adapted to separate liquid and fine solid particles from compressed air flowed in the collection container 14 via the inflow port 11, to collect the liquid and particles, and to supply purified compressed air from the outflow port 12 to the pneumatic equipment and the like. The separated and collected liquid and the like is accumulated in a liquid accumulating portion disposed below the separation space. When the liquid level of the accumulated liquid becomes equal to or larger than a predetermined value, the accumulated liquid is automatically discharged to the outside.

FIGS. 2 to 5 are sectional views each showing a principal part of the automatic drain of FIG. 1. An exhaust portion 16 provided to the bottom of the collection container 14 has a discharge hole 17 through which liquid accumulated in a liquid accumulating portion 14a in the collection container 14 is discharged to the outside. A drain pipe 18 is inserted in the discharge hole 17, and an operation knob 19 allows the drain pipe 18 to be detachably attached to the exhaust portion 16. A sealing member 18a is attached to the drain pipe 18 to seal up a gap between the drain pipe 18 and the discharge hole 17.

Figure 2:
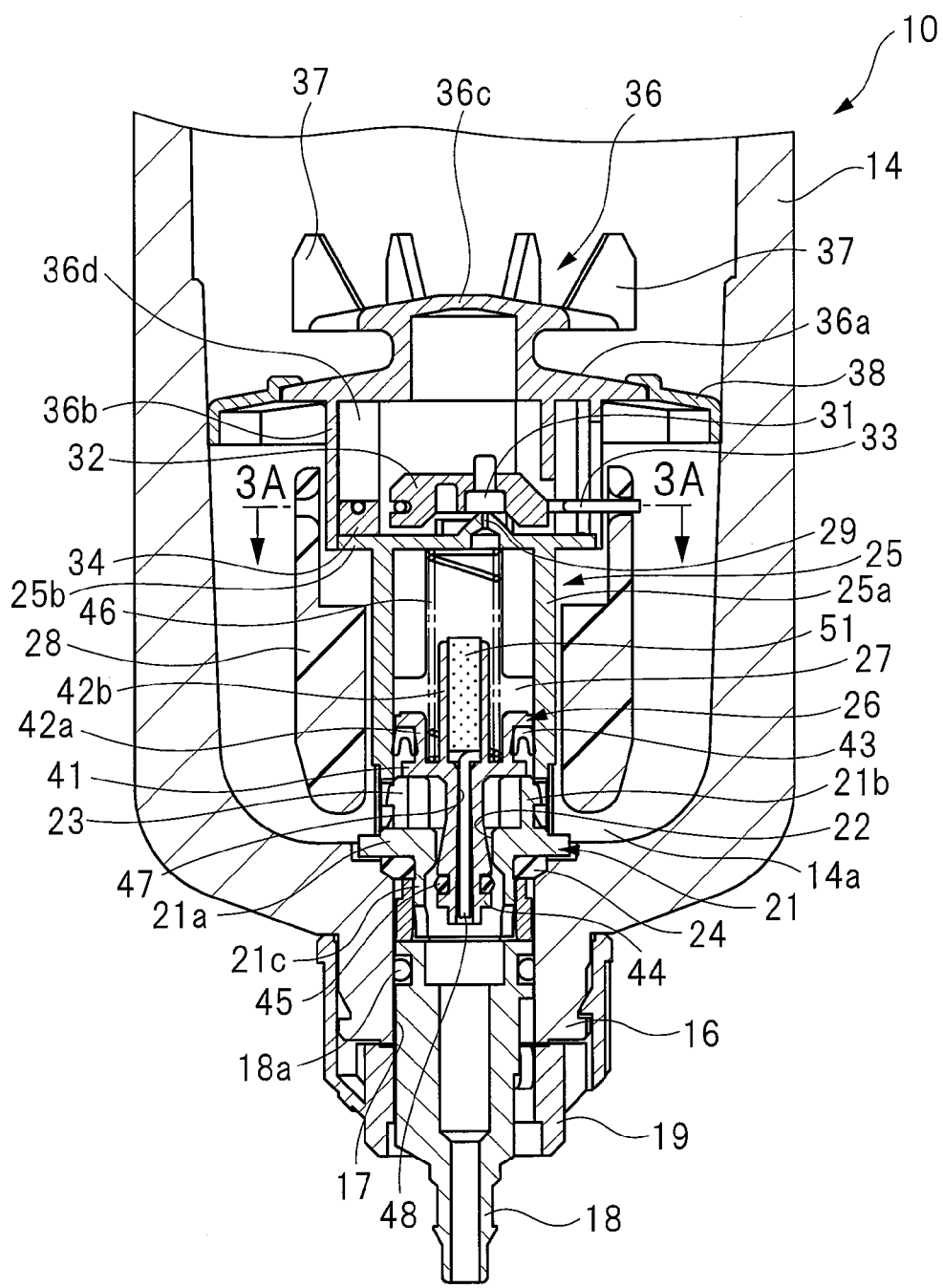
FIG. 2 is a sectional view showing a principal part of the automatic drain of FIG. 1, compressed air being not supplied to a normally open type collection container.
Figure 4A:
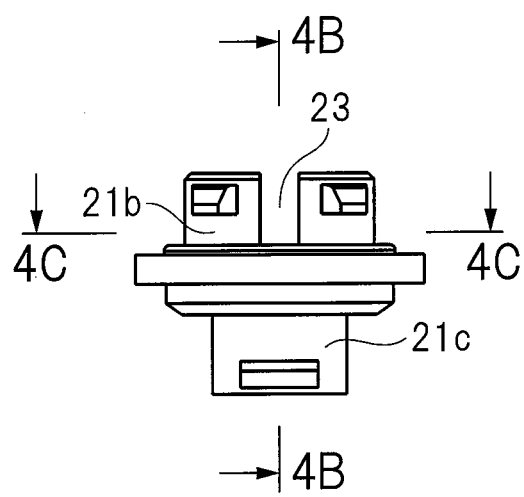
FIG. 4A is an enlarged front view showing an exhaust pipe, a valve seat, and a float support that are shown in FIG. 2.
Figure 4B:
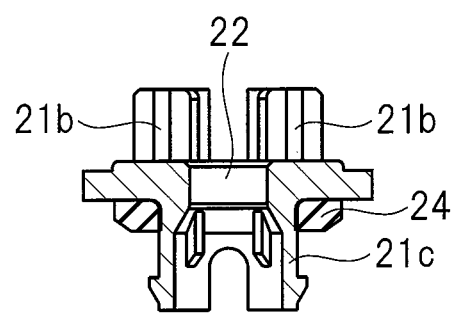
FIG. 4B is a sectional view taken along a 4B-4B line of FIG. 4A.
Figure 4C:
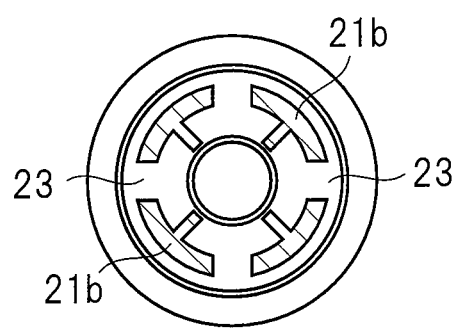
FIG. 4C is a sectional view taken along a 4C-4C line of FIG. 4A.
Figure 5A:
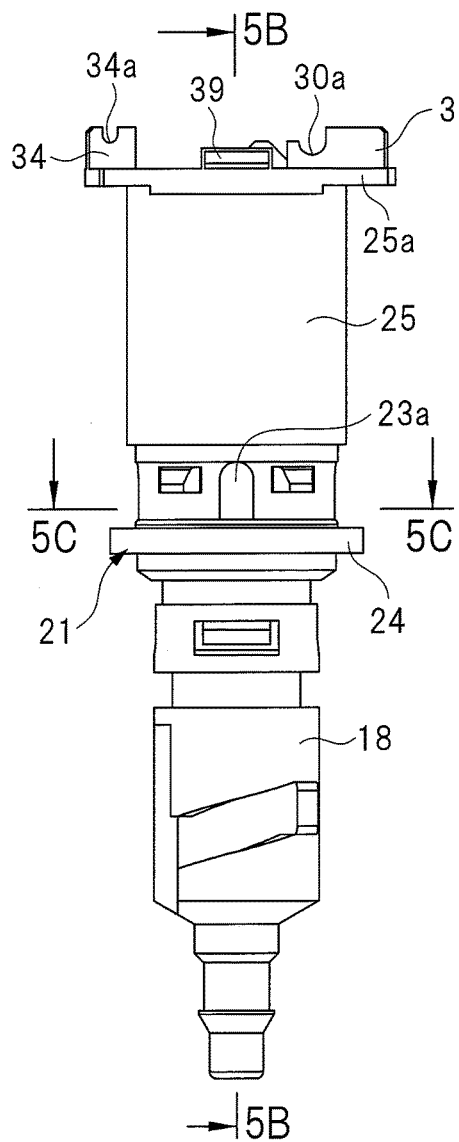
FIG. 5A is an enlarged front view showing the valve seat.
Figure 5B:
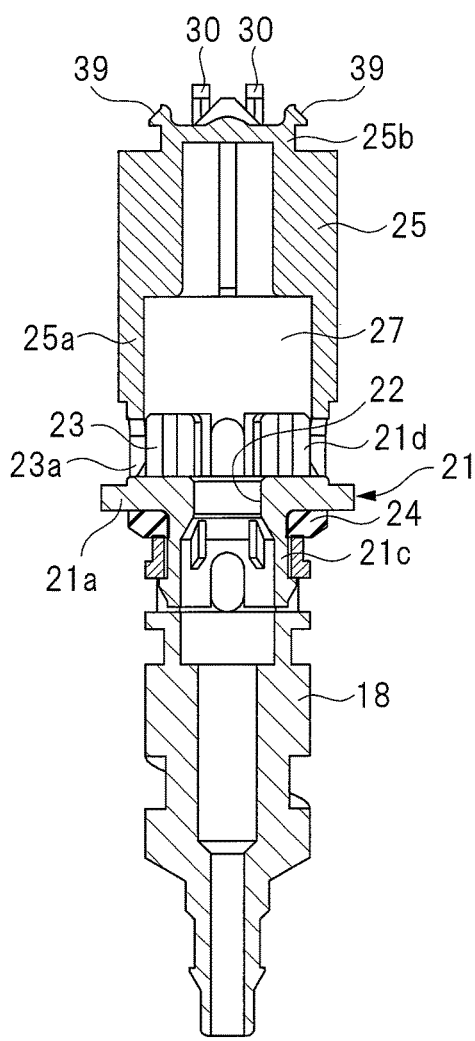
FIG. 5B is a sectional view taken along a 5B-5B line of FIG. 5A.
Figure 5C:
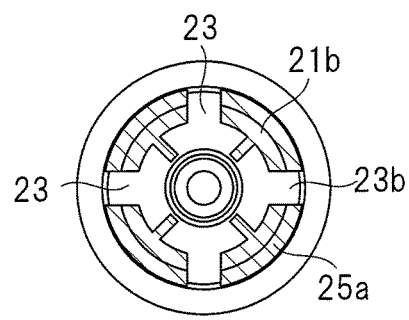
FIG. 5C is a sectional view taken along a 5C-5C line of FIG. 5A.

As shown in FIG. 2, a valve seat 21 is attached to the bottom of the collection container 14. The valve seat 21 has: a disc portion 21a fixed to the bottom of the collection container 14; an upper cylindrical portion 21b projecting upward from the disc portion 21a; and a lower cylindrical portion 21c projecting downward from the disc portion 21a. A drain hole 22 is provided to the valve seat 21. The liquid accumulating portion 14a in the collection container 14 communicates with the discharge hole 17 via the drain hole 22 and slits 23 provided to the upper cylindrical portion 21b. As shown in FIGS. 4C and 5C, four slits 23 are formed at predetermined intervals in the circumferential direction. A sealing member 24 is attached between the lower cylindrical portion 21c and the collection container 14, and the sealing member 24 seals up a gap between the valve seat 21 and the collection container 14.

As shown in FIG. 2, a float support 25 is disposed on top of the valve seat 21. The float support 25 is made of resin material by injection molding, etc., and it has a cylinder portion 25a and a top wall portion 25b integrally provided to the upper end of the cylinder portion 25a. The float support 25 is disposed on top of the valve seat 21, and the lower end face of the cylinder portion 25a abuts on the valve seat 21. As shown in FIG. 5B, slits 23a are provided to the cylinder portion 25a so as to correspond to the slits 23 provided to the valve seat 21.

A piston 26 is incorporated in the cylinder portion 25a of the float support 25, and slidably movable in the axial direction in the cylinder portion 25a. A piston chamber 27 is formed between the piston 26 and the top wall portion 25b. On the outside of the float support 25, a vertically movable cylindrical float 28 is disposed in such a way as to encircle the float support 25. The float 28 is made of material whose specific gravity is lighter than that of such liquid as water, and is moved up and down by liquid accumulated in the liquid accumulating portion 14a of the collection container 14. A vent hole 29 is provided to the top wall portion 25b of the float support 25. The piston chamber 27 communicates with the separation space in the collection container 14 via the vent hole 29.

Figure 3A:
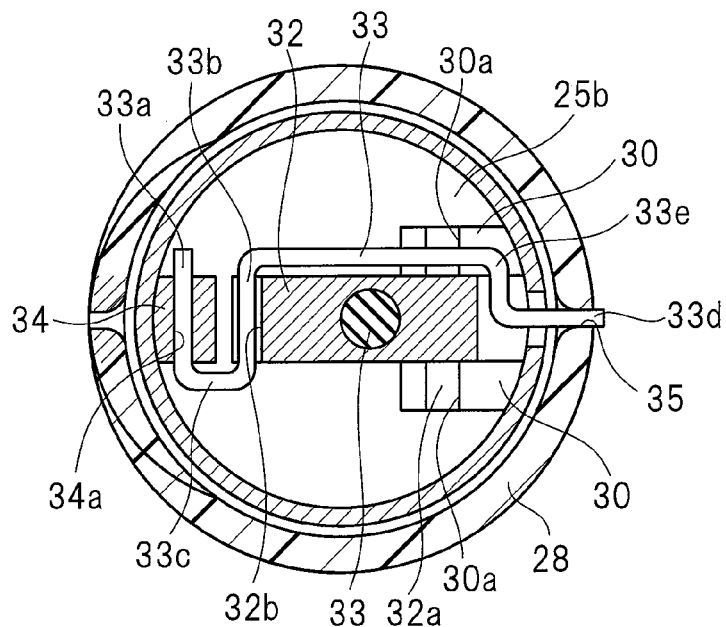
FIG. 3A is a sectional view taken along a 3A-3A line of FIG. 2.

A vent valve 31 for opening and closing the vent hole 29 is disposed on a valve holder 32. As shown in FIG. 3A, the valve holder 32 has: a rocking support end shown on the right in FIG. 3A; and a vertically movable end shown on the left in FIG. 3A. As shown in FIGS. 3A, 5A, and 5B, a support bracket 30 is disposed on the top wall portion 25b of the float support 25. A rocking support pin 32a is disposed adjacent to both sides of the rocking support end of the valve holder 32. The rocking support pin 32a is projecting from both sides of the rocking support end of the valve holder 32. The rocking support pin 32a is supported in an engaging slot 30a provided to the support bracket 30.

As shown in FIG. 3A, a driving lever 33 has a base end 33a supported in a first engaging slot 34a of a support bracket 34 provided to the top wall portion 25b, and an operating portion 33b engaged with a second engaging slot 32b provided to the vertically movable end of the valve holder 32. The base end 33a and the operating portion 33b extend in the width direction of the valve holder 32, and they are integral with each other via a connecting portion 33c to form an integral portion which is bent into a "U" shape. A front end 33d of the driving lever 33 is inserted in a fitting hole 35 provided to the upper end of the float 28, and the front end 33d is integral with the operating portion 33b via a bent connecting portion 33e.

When the level of the liquid accumulated in the collection container 14 increases to become equal to or higher than a predetermined liquid level, the float 28 moves up. Since the front end 33d of the driving lever 33 is inserted in the fitting hole 35 provided to the upper end of the float 28, the upward movement of the float 28 moves the front end 33d up. The base end 33a of the driving lever 33 is supported pivotally in the engaging slot 34a in such a way as to be incapable of moving up or down. As a result, the operating portion 33b placed between the base end 33a and the front end 33d moves up as the float 28 moves up. The operating portion 33b is engaged with the vertically movable end of the valve holder 32 via the second engaging slot 32b. The vertically movable end of the valve holder 32, therefore, also moves up as the operating portion 33b moves up. The rocking support end of the valve holder 32, however, does not move up because it is pivotally supported on the support bracket 30. The upward move of the vertically movable end of the valve holder 32 causes the vent valve 31 to move up, thus opening the vent hole 29. In this manner, the bent driving lever 33 turns the upward/downward move of the float 28 into the opening/closing move of the vent hole 31.

As described above, the operating portion 33b of the driving lever 33 moves up as a result of the upward move of the float 28, causing the vent valve 31 to open the vent hole 29. As a result, compressed air in the collection container 14 is supplied into the piston chamber 27 through the vent hole 29. When the float 28 moves down, the vent valve 31 closes the vent hole 29.

As shown in FIG. 2, a baffle 36 is mounted on top of the float support 25, where the baffle 36 partitions the separation space into an upper space and a lower space. The baffle 36 has a body disc portion 36a and a cylindrical fitting portion 36b integrally provided with the body disc portion 36a and projecting downward. The cylindrical fitting portion 36b is attached to the top wall portion 25b of the float support 25. The body disc portion 36a is integrally formed with an upper disc portion 36c, and the upper disc portion 36c is integrally provided with a plurality of fins 37 extending in upward and radial directions. The upper disc portion 36c is integrally provided with the body disc portion 36a. The plurality of fins 37 are provided to the upper disc portion 36c in such a way as to face in the radial direction and project upward. An annular partition panel 38 is attached to the outer periphery of the body disc portion 36a, where the annular partition panel 38 partitions the baffle 36 from the inner peripheral surface of the collection container 14. The partition panel 38 has a cutout and a through hole, which lead droplets dropped on the baffle 36 to the liquid accumulating portion 14a of the collection container 14. A stopper 36d in contact with the base end 33a of the driving lever 33 is integrally provided to the baffle 36. The base end 33a of the driving lever 33 is kept in the engaging slot 34 by the stopper 36d.

In order to mount the baffle 36 on the float support 25, as shown in FIGS. 5A and 5B, two engaging claws 39 are provided to the top wall portion 25b of the float support 25. The engaging claws 39 are engaged with respective slots (not shown) provided to the fitting cylindrical portion 36b of the baffle 36.

The piston 26 is made of resin material by injection molding, etc., and it has a disc portion 41, a large-diameter cylindrical portion 42a extending upward, and a drain valve 44 extending downward from the disc portion 41. A piston packing 43 is attached to the outside of the large-diameter cylindrical portion 42a to seal up a gap between the piston 26 and cylindrical portion 25a. A hollow shaft portion is integrally provided with the disc portion 41 and is projecting downward. This hollow shaft portion makes up the drain valve 44. The drain valve 44 penetrates the drain hole 22 provided to the valve seat 21. The drain valve 44 has a shape whose outer diameter gradually increases toward its front end. A sealing member 45 is attached to the front end of the drain valve 44. The sealing member 45 comes in contact with the drain hole 22 when the hollow shaft portion moves up. The drain valve 44 moves up and down together with the piston 26 to a closing position at which the sealing member 45 comes in contact with the drain hole 22 to close it and to an open position at which the sealing member 45 is separated away from the drain hole 22 to open the drain hole 22.

An opening spring 46 is placed in the piston chamber 27. The opening spring 46 applies a spring force to the drain valve 44, which is integral with the piston 26, in a direction causing the drain valve 26 to move toward the open position. A compression coil spring is used as the opening spring 46. One end of the opening spring 46 is in contact with the top wall portion 25b of the float support 25, and the other end of the opening spring 46 is in contact with the disc portion 41 of the piston 26. When only the spring force is applied to the piston 26 to cause the drain valve 44 to move toward the open position, the automatic drain 10 works as a normally open type. In the normally open type automatic drain 10, when compressed air is not supplied from the inflow port 11 into the collection container 14, the drain valve 44 takes the open position to open the drain hole 22 as shown in FIG. 2. When compressed air is supplied into the collection container 14, the piston 26 is pushed upward against the spring force to cause the drain valve 44 to close the drain hole 22.

Figure 3B:
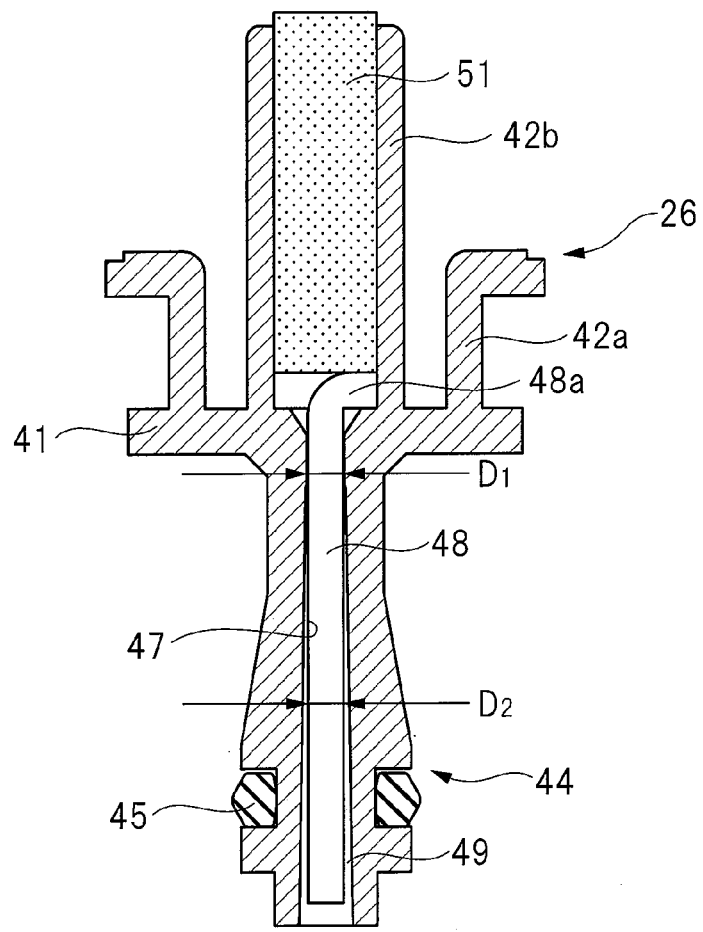
FIG. 3B is an enlarged sectional view showing a piston and a drain valve shown in FIG. 2.

A bleed hole 47 is provided and disposed on the axis of the drain valve 44, and the piston chamber 27 communicates with the discharge hole 17 via the bleed hole 47. An orifice pin 48 having an outer diameter smaller than the minimum inner diameter of the bleed hole 47 is placed in the bleed hole 47. As shown in FIG. 3B, a bleed channel 49 is formed between the bleed hole 47 and the orifice pin 48. An engaging portion 48a is provided to the upper end of the orifice pin 48. The engaging portion 48a is disposed in contact with the disc portion 41 to determine the position of the orifice pin 48 in the vertical direction.

When the level of the liquid collected and accumulated in the collection container 14 rises, and the vent valve 31 opens, compressed air in the collection container 14 flows into the piston chamber 27, and pushes the upper surface of the piston 26 downward. The lower surface of the piston 26 is already subjected to the same pressure as the pressure of compressed air before compressed air flows into the piston chamber 27, when the compressed air pushes the upper surface of the piston 26 downward, the spring force of the opening spring 46 also forces the piston 26 to move down. The drain valve 44 is, therefore, pushed down as the piston 26 is pushed down, thus opening the drain hole 22. As a result, the liquid in the collection container 14 flows through the slits 23 provided to the valve seat 21 to drain out of the drain hole 22. As the liquid drains out from the collection container 14, the float 28 starts descending. At a certain point of descending of the float 28, the vent valve 31 closes the vent hole 29. This prevents supply of fresh compressed air to the piston chamber 27. As a result, the compressed air in the piston chamber 27 is gradually discharged from the discharge hole 17 via the bleed channel 49, to the outside, which causes the internal pressure of the piston chamber 27 to start dropping. With the compressed air discharged to a certain extent, the piston 26 starts moving up. With the piston 26 moved up to a certain extent, the drain valve 44 closes the drain hole 22. In this manner, the length of time required for discharging the compressed air in the piston chamber 27 corresponds to the length of time during which the drain hole 22 is kept open. In other words, the length of time required for discharging the compressed air corresponds to the length of time required for discharging the collected liquid to the outside.

As shown in FIG. 3B, the inner diameter D1 of the bleed hole 47 and the outer diameter D2 of the orifice pin 48 are determined such that D2<D1. By determining a difference between the inner diameter D1 and the outer diameter D2 to be small, the bleed channel 49 with a tiny cross section is formed between the bleed hole 47 and the orifice pin 48. The orifice pin 48 is formed of a straight bar with a circular cross section and has the outer diameter identical through its whole length. The bleed hole 47 has a circular section and is formed as a tapered hole whose inner diameter increases gradually toward its lower end.

Forming an elongated hole with an inner diameter of about 0.1 mm on the hollow shaft portion of the drain valve 44 is technically difficult, but forming the same with an inner diameter of about 0.5 mm is not difficult, in which case the hole can be fabricated with the high dimensional precision of its inner diameter maintained. A metal bar with an outer diameter of about 0.1 mm is difficult to handle because it may be bent or broken during the manufacturing process. A metal bar with an outer diameter of about 0.5 mm, however, raises no concern of being bent or broken and is finished with an outer diameter highly precise. In this manner, in a hole with a relatively large inner diameter, a metal bar with an outer diameter slightly smaller than the inner diameter of the hole is placed. This ensures the high dimensional precision of a gap between the hole and the metal bar.

In FIG. 3B, the bleed hole 47 has an inner diameter D1 set to be 0.82 mm, and the orifice pin 48 has an outer diameter D2 set to be 0.80 mm. The gap between the bleed hole 47 and the orifice pin 48 is, therefore, 0.02 mm. In this dimensional setting, when the bleed channel 49 is formed between the bleed hole 47 and the orifice pin 48, the channel area "S" of the bleed channel 49 can be determined to be small with high machining accuracy.

The channel area "S" is given by the equation: $S=\Pi(D1/2)^2-\Pi(D2/2)^2$. In this manner, the bleed channel 49 between the bleed hole 47 and the orifice pin 48 determines the sectional area of the bleed hole 47 and orifice pin 48 to be larger than the channel area "S". The channel area "S" of the bleed channel 49 is thus determined easily with high precision.

As shown in FIG. 3B, a small-diameter cylindrical portion 42b disposed on the inside of the large-diameter cylindrical portion 42a is provided to the disc portion 41 of the piston 26. A filter element 51 made of porous material is provided in the small-diameter cylindrical portion 42b. A sintered resin, sintered metal, etc., is used as the porous material. The filter element 51 filters out minute solids from air flowing from the piston chamber 27 into the bleed channel 49 to prevent foreign matters from entering the bleed channel 49. The filter element 51 is in contact with the engaging portion 48a of the orifice pin 48, which engaging portion 48a is thus held between the filter element 51 and the disc portion 41. In this manner, the orifice pin 48 is fixed by being held between the filter element 51 and the piston 26.

A liquid discharge operation carried out by the automatic drain 10 of the normally open (NO) type shown in FIGS. 2 to 8 will then be described.

Figure 6:
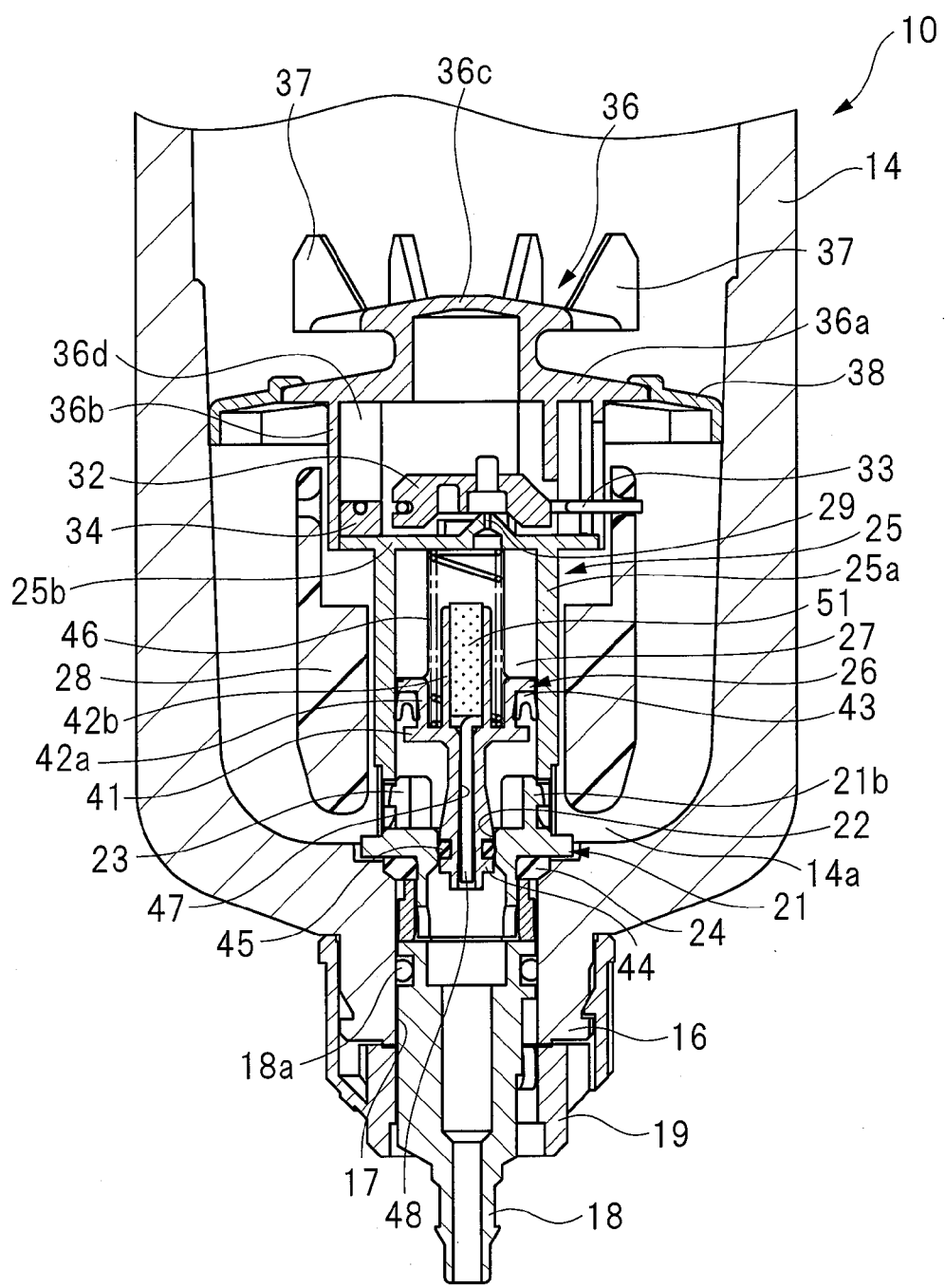
FIG. 6 is a sectional view showing the automatic drain shifted from a state of FIG. 2 to a state in which supplied compressed air is in the collection container.

FIG. 2 shows a state in which compressed air is not supplied into the collection container 14. In this state, the drain valve 44, together with the piston 26, is pushed down by the spring force of the opening spring 46 to stay at the opening position at which the drain valve 44 opens the drain hole 22. In this state, when compressed air is supplied through the inflow port 11 into the separation space in the collection container 14, the compressed air passes through the slits 23 and applies an upward thrust to the piston 26, as shown in FIG. 6. Subjected to the thrust, the piston 26 moves up, causing the drain valve 44 to close the drain hole 22. This prevents the compressed air supplied into the collection container 14 from leaking outside. In this state, as compressed air keeps flowing from the inflow port 11 to the outflow port 12, a liquid component contained in the compressed air falls down and is consequently collected and accumulated in the liquid accumulating portion 14a on the bottom of the collection container 14. As the accumulated liquid gradually increases, the float 28 moves up gradually.

Figure 7:
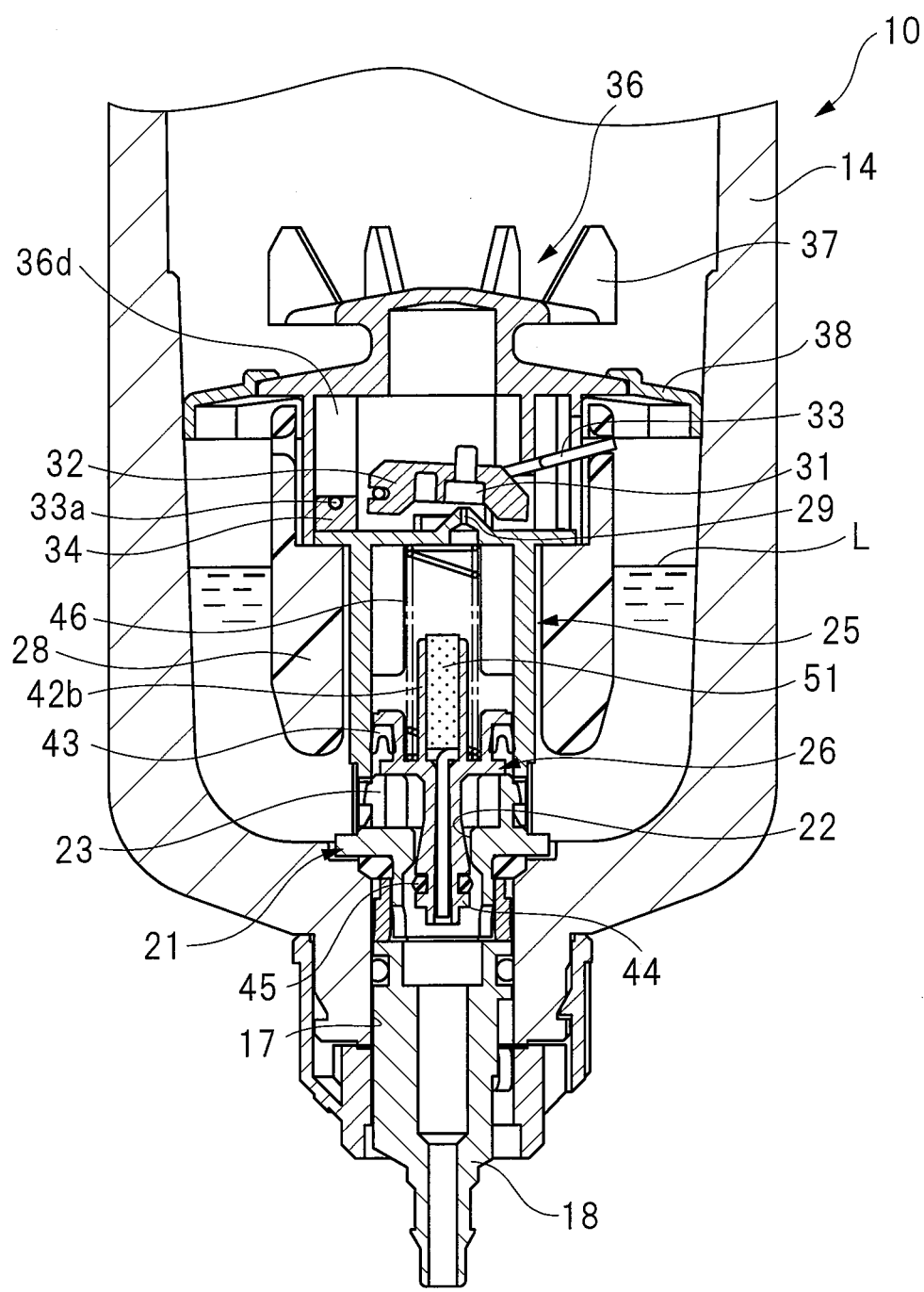
FIG. 7 is a sectional view showing a state in which liquid collected from compressed air supplied to the collection container causes a float to move up, and the automatic drain is about to discharge liquid from the collection container.

FIG. 7 shows a state in which the level "L" of the accumulated liquid has risen to a predetermined level and consequently the float 28 has moved up. The upward move of the float 28 causes the vent valve 31 to open the vent hole 29, as shown in FIG. 7. The opened vent hole 29 allows the compressed air in the collection container 14 to flow through the vent hole 29 into the piston chamber 27, in which the piston 26 is pushed down immediately. As a result, the drain valve 44 opens the drain hole 22, through which the liquid in the collection container 14 is discharged to the outside. The length of time required for discharging the liquid corresponds to the length of time required for discharging the compressed air in the piston chamber 27 as a contracted flow of air through the bleed channel 49 to the outside. After the compressed air in the piston chamber 27 is discharged to the outside, the internal pressure of the collection container 14 is applied as an upward thrust to the piston 26, causing it to move up. As a result, the drain valve 44 closes the drain hole 22.

Figure 8:
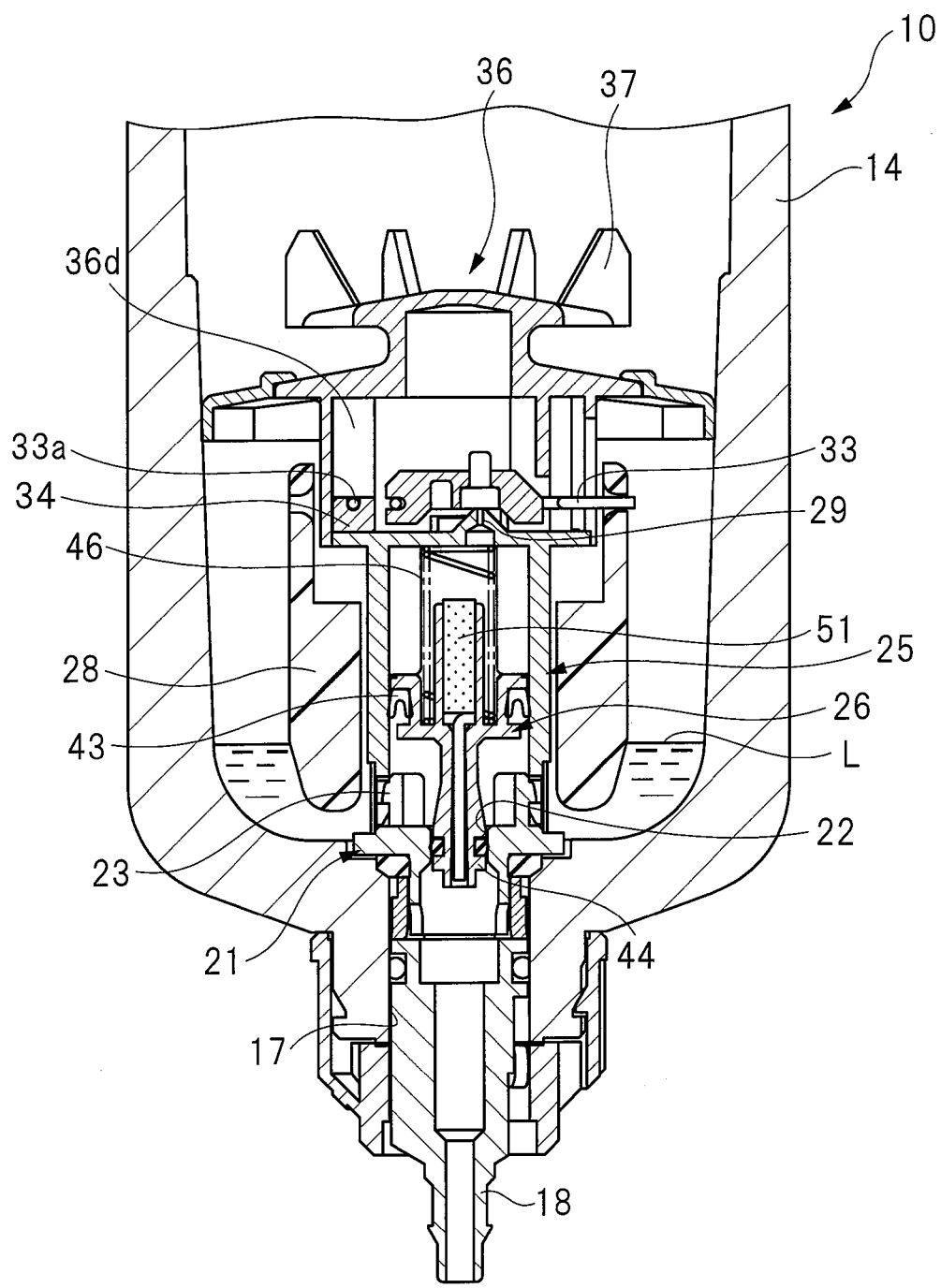
FIG. 8 is a sectional view showing that the automatic drain is in a state following the state of FIG. 7, and collecting liquid from the supplied compressed air after completion of discharge of liquid to the outside.

FIG. 8 shows a state in which after the float 28 moves down and the drain valve 44 closes the drain hole, liquid is collected continuously. In this state, a liquid component contained in compressed air flowing in through the inflow port 11 is kept filtered out and accumulated at the bottom of the collection container 14.

As described above, because the bleed channel 49 is formed between the bleed hole 47 and the orifice pin 48, the channel area "S" of the bleed channel 49 is determined with high dimensional precision. As a result, the outflow time of compressed air flowing from the piston chamber 27 through the bleed channel 49 to the outside can be determined precisely to be a desired time. This allows operational setting which causes the drain valve 44 to close the drain hole 22 right after completion of discharging of the accumulated liquid to the outside, in which case the drain hole 22 is never closed when the liquid still remains in the collection container 14.

FIGS. 9 to 12 are sectional views showing a liquid discharge operation carried out by the automatic drain 10 of the normally closed (NC) type.

Incorporating a spring 52 for normally closed type into the above-described automatic drain 10 of the normally open type provides the automatic drain 10 of the normally closed type. The spring 52 for normally closed type is attached between the drain valve 44 and the exhaust pipe 18, and is provided as a conical coil spring. An end of the small-diameter side of the spring 52 for normally closed type is in contact with the lower end face of the drain valve 44, while an end of the large-diameter side of the spring 52 for normally closed type is in contact with a stepped portion 53 provided to the exhaust pipe 18. The spring 52 for normally closed type applies a spring force to the drain valve 44 in a direction causing the drain valve 44 to close the drain hole 22. The spring force of the spring 52 for normally closed type is stronger than that of the opening spring 46. When no compressed air is supplied into the collection container 14, therefore, the drain valve 44 subjected to the spring force of the spring 52 for normally closed type closes the drain hole 22.

Figure 9:
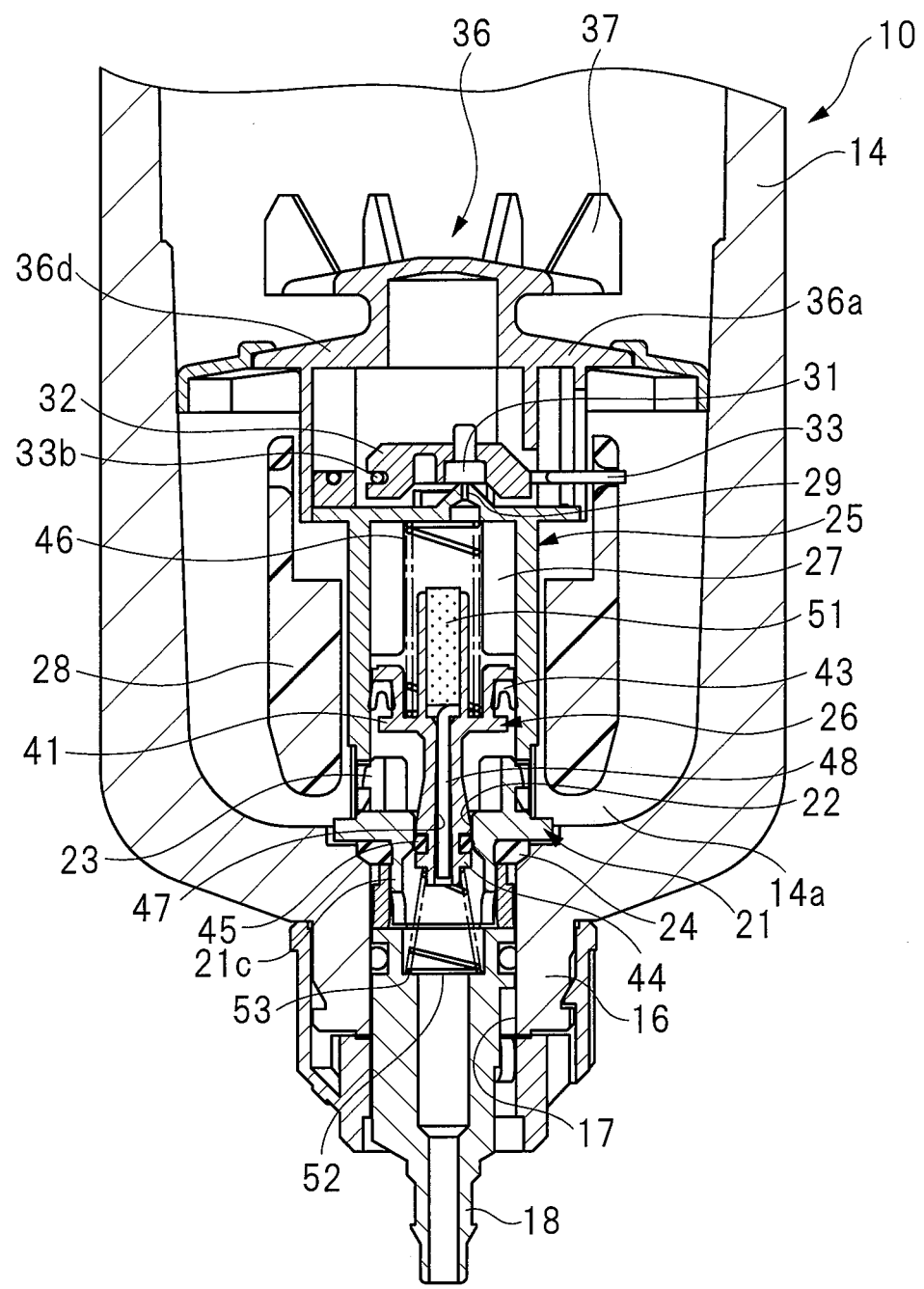
FIG. 9 is a sectional view of the principal part of the automatic drain of FIG. 1, compressed air being not supplied to the normally closed type collection container.
Figure 10:
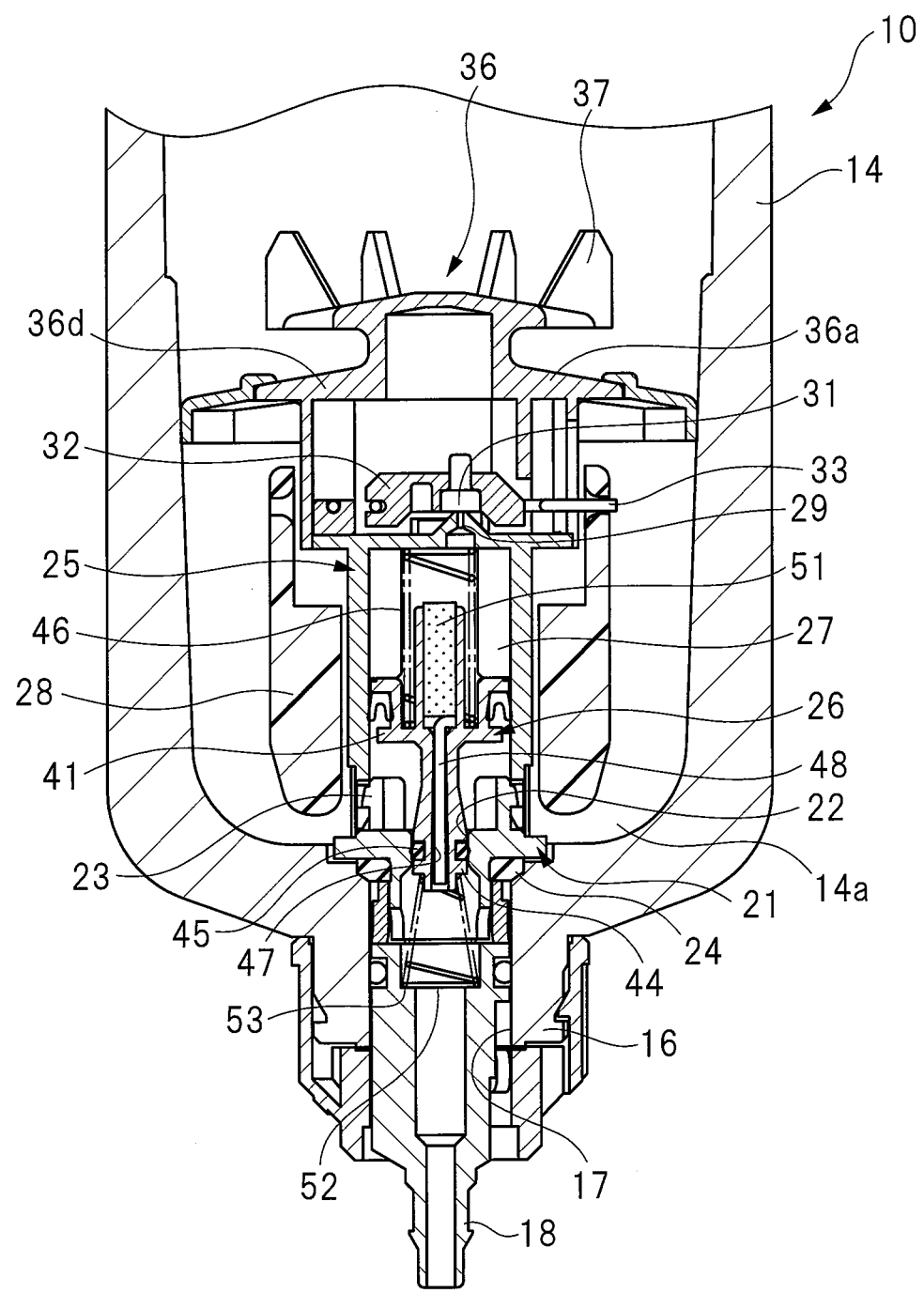
FIG. 10 is a sectional view showing the automatic drain shifted from a state of FIG. 9 to a state in which supplied compressed air is in the collection container.

FIG. 9 shows a state in which compressed air is not supplied into the collection container 14. In this state, the drain valve 44, together with the piston 26, is pushed up by the spring force of the spring 52 for normally closed type to take the closing position at which the drain valve 44 closes the drain hole 22. In this state, compressed air is supplied via the inflow port 11 into the collection container 14. FIG. 10 shows a state in which compressed air is supplied into the collection container 14, and the drain valve 44 keeps closing the drain hole 22 as in the state of FIG. 9. Liquid contained in the supplied compressed air is collected and accumulated in the liquid accumulating portion 14a.

Figure 11:
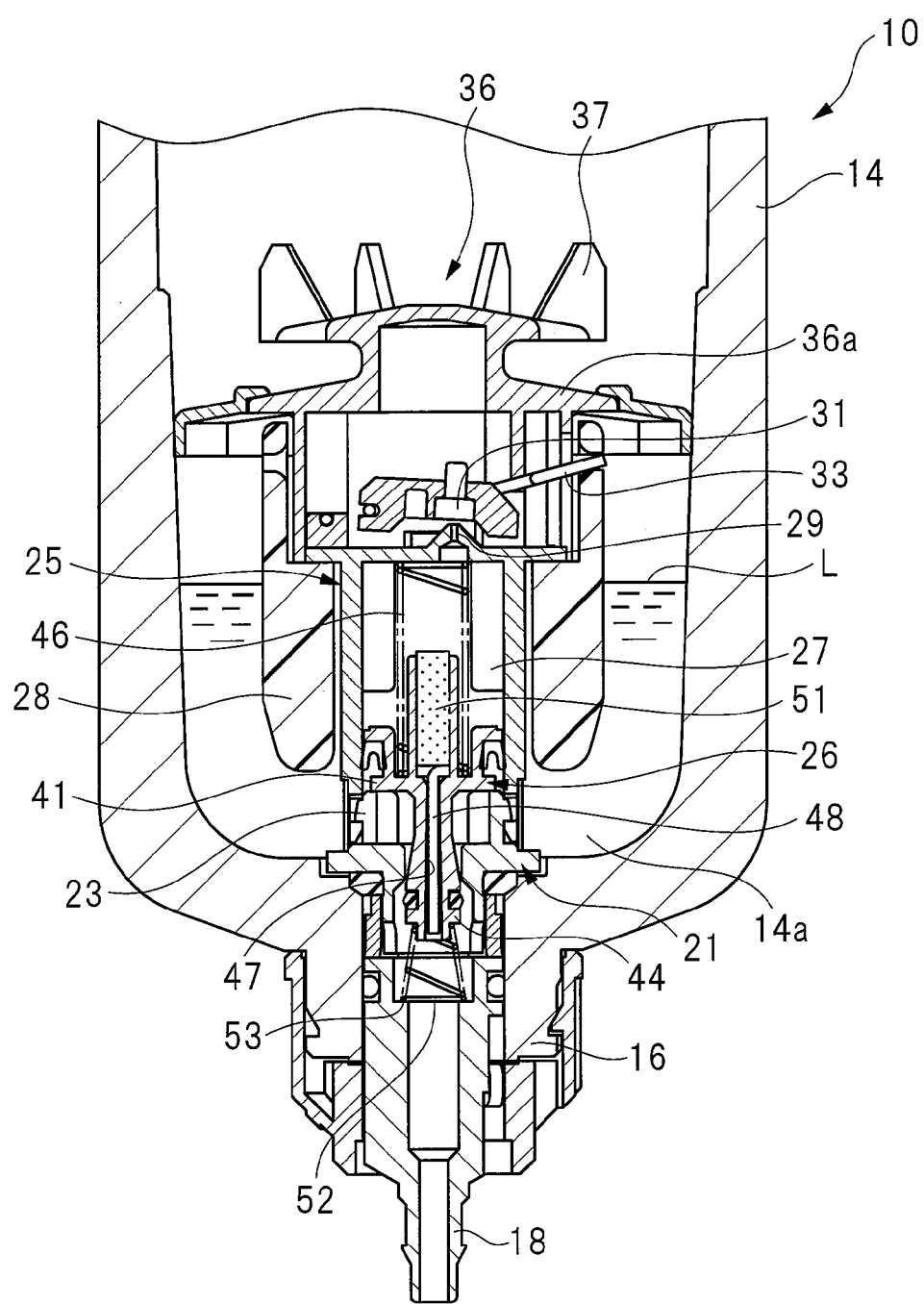
FIG. 11 is a sectional view showing a state in which liquid collected from compressed air supplied to the collection container causes a float to move up, and the automatic drain is about to discharge liquid from the collection container.

FIG. 11 shows a state in which the level "L" of the accumulated liquid has risen to the predetermined liquid level and the float 28 has moved up. The upward move of the float 28 causes the vent valve 31 to open the vent hole 29, as shown in FIG. 11. When the vent hole is in an open state, the vent hole 29 allows the compressed air in the collection container 14 to flow through the vent hole 29 into the piston chamber 27, and the piston 26 is pushed down. As a result, the drain valve 44 opens the drain hole 22, through which the liquid in the collection container 14 is discharged to the outside. The length of time required for discharging the liquid corresponds to the length of time required for discharging the compressed air in the piston chamber 27 as a contracted flow of air through the bleed channel 49 to the outside, as in the case of the above normally open type. When the compressed air in the piston chamber 27 is discharged to the outside, the compressed air in the collection container 14 applies a thrust from below to the piston 26 in a direction of closing the drain valve 44. As a result, the drain valve 44 closes the drain hole 22.

Figure 12:
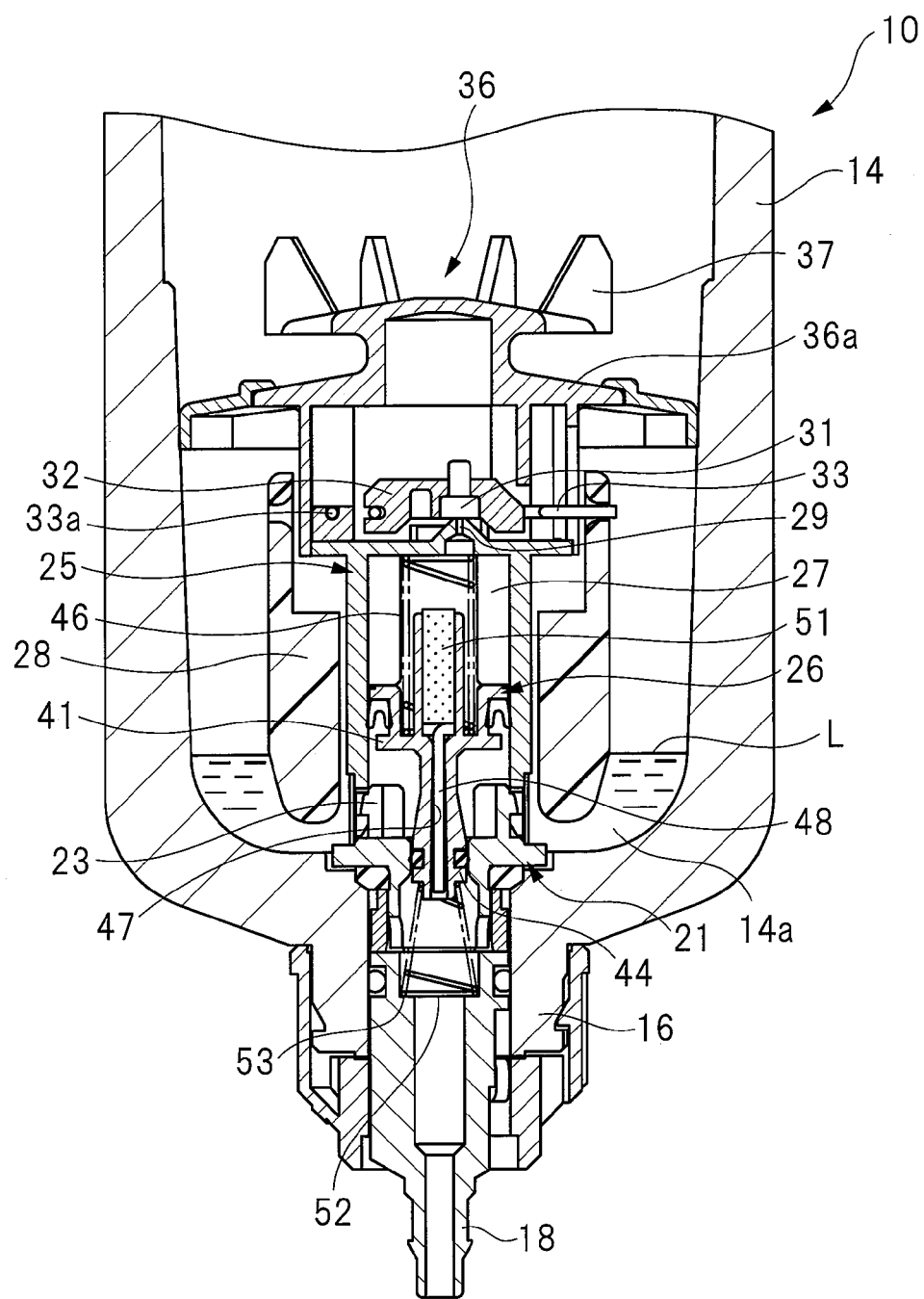
FIG. 12 is a sectional view showing that the automatic drain is in a state following the state of FIG. 11, and collecting liquid from the supplied compressed air after completion of discharge of liquid to the outside.

FIG. 12 shows a state in which after the float 28 moves down and the drain valve 44 closes the drain hole 22, liquid is collected continuously. In this state, a liquid component contained in compressed air flowing in through the inflow port 11 is kept filtered out and accumulated at the bottom of the collection container 14.

The present invention is not limited to the above embodiment and may be modified into various forms of application on the condition that the modification does not deviate from the substance of the invention. While the above embodiment shows an application of the present invention as a single automatic drain, the automatic drain of the present invention may constitute a filter regulator combined with a regulator. The automatic drain of the above embodiment includes the filter element assembly 15 but the automatic drain may dispense with the filter element assembly 15. The automatic drain may work not only as a filtering mechanism having a filter element but also as an automatic drain structured to be capable of separating foreign matters by a centrifugal force.

The present invention applies to an air pressure line through which compressed air from an air pressure source is supplied to air-supplied components such as pneumatic equipment.

Although various embodiments of the present invention have been described and shown, the invention is not restricted thereto, but may also be embodied in other ways within the scope of the subject-matter defined in the following claims.

What is claimed is:

1. An automatic drain comprising: a port block, an inflow port and an outflow port being provided to an upper part of the port block; and a collection container, a discharge hole being provided to a bottom part of the collection container, liquid separated from compressed air flowing from the inflow port to the outflow port is automatically discharged to outside, the automatic drain further comprising:
    a valve seat having a drain hole through which an inside of the collection container communicates with the discharge hole, the valve seat being attached to the bottom part of the collection container;
    a float support disposed on top of the valve seat, the float support having: a cylindrical portion provided with a lower end which abuts on the valve seat; and a top wall portion provided to an upper end of the cylindrical portion;
    a piston slidably incorporated in the cylindrical portion, a piston chamber being formed between the piston and the top wall portion of the float support;
    a float disposed on the outside of the float support, the float being moved up and down by liquid accumulated in the collection container;
    a vent valve in which, when the float moves up, the vent valve opens a vent hole provided to the top wall portion to supply air in the collection container to the piston chamber and that when the float moves down, closes the vent hole;
    a drain valve provided to the piston, the drain valve being shifted to a closed position at which the drain valve closes the drain hole and to an open position at which the drain valve opens the drain hole, the drain valve being provided with a bleed hole, the piston chamber communicating with the discharge hole via the bleed hole;
    an opening spring attached to the piston chamber, the opening spring applying an opening spring force to the drain valve in a direction causing the drain valve to move to the open position; and
    an orifice pin placed in the bleed hole, the orifice pin forming a bleed channel between the orifice pin and an inner surface of the bleed hole,
    wherein the orifice pin has a bent upper portion forming an engagement portion which is engaged with the piston.

2. The automatic drain according to claim 1, further comprising a closing spring which applies a closing spring force to the drain valve in a direction opposite to the opening spring force and moves the drain valve to the closed position from the open position, the drain valve taking the closed position when compressed air is not being supplied into the collection container,
    wherein the closing spring force is greater than the opening spring force.

3. The automatic drain according to claim 1, wherein the piston is provided with a filter element which is made of porous material and which filters out foreign matters from air flowing from the piston chamber into the bleed channel.

4. The automatic drain according to claim 3, wherein the filter element abuts on the engagement portion engaged with the piston, the engagement portion being held between the filter element and the piston so that the orifice pin is fixed to the piston.

5. The automatic drain according to claim 3, wherein the filter element has a bottom portion that abuts on the engagement portion engaged with the piston so that the orifice pin is fixed to the piston.

6. The automatic drain according to claim 3, wherein
    the piston includes: a large-diameter cylindrical portion, a piston packing being attached to the outside of the large-diameter cylindrical portion; and a small-diameter cylindrical portion that is hollow and extends in an axial direction of the piston on the inside of the large-diameter cylindrical portion,
    wherein the filter element is attached to provided inside the small-diameter cylindrical portion, and
    wherein the piston chamber and the bleed channel communicate with each other via the filter element.

7. The automatic drain according to claim 6, wherein the filter element abuts on the engagement portion engaged with the piston so that the orifice pin is fixed to the piston.

* * * * *

UNITED STATES PATENT AND TRADEMARK OFFICE
CERTIFICATE OF CORRECTION

| | | |
|---|---|---|
| PATENT NO. | : 9,970,594 B2 | Page 1 of 1 |
| APPLICATION NO. | : 15/301077 | |
| DATED | : May 15, 2018 | |
| INVENTOR(S) | : Doki | |

It is certified that error appears in the above-identified patent and that said Letters Patent is hereby corrected as shown below:

In Claim 6, Column 12, Line 43, after the word is, please delete "attached to".

Signed and Sealed this
Seventeenth Day of July, 2018

Andrei Iancu
*Director of the United States Patent and Trademark Office*